United States Patent
McCraw

(10) Patent No.: US 7,213,893 B1
(45) Date of Patent: May 8, 2007

(54) TRACK COVER

(76) Inventor: Mark McCraw, 1042 Audobon Trail, Chattanooga, TN (US) 37421

( * ) Notice: Subject to any disclaimer, the term of this patent is extended or adjusted under 35 U.S.C. 154(b) by 134 days.

(21) Appl. No.: 10/942,243

(22) Filed: Sep. 16, 2004

(51) Int. Cl.
  *B62D 55/088* (2006.01)
(52) U.S. Cl. ............ 305/100; 305/107; 280/847; 296/136.01
(58) Field of Classification Search ........... 305/100, 305/107, 60; 180/9.1; 280/847, 850, 770; 150/166; 52/DIG. 14; 296/136.01, 136.07, 296/136.08, 136.1, 136.12
See application file for complete search history.

(56) References Cited

U.S. PATENT DOCUMENTS

| | | | |
|---|---|---|---|
| 1,085,154 A | | 1/1914 | Newsom |
| 1,559,458 A | * | 10/1925 | Rizianu ............. 150/166 |
| 1,584,518 A | * | 5/1926 | Drake ............... 150/166 |
| 2,119,072 A | | 5/1938 | Cohen |
| 2,311,514 A | | 2/1943 | Bramblett |
| 2,451,553 A | * | 10/1948 | Hedquist et al. ....... 280/770 |
| 2,528,683 A | | 11/1950 | Bowman et al. |
| 3,180,441 A | * | 4/1965 | Reaves ............. 180/313 |
| 3,770,035 A | | 11/1973 | Haye, Sr. |
| 3,776,094 A | * | 12/1973 | Gilles et al. ......... 89/36.02 |
| 3,927,578 A | | 12/1975 | Mattila |
| 3,968,913 A | | 7/1976 | Weed et al. |
| 4,024,820 A | | 5/1977 | Hlinsky et al. |
| 4,068,905 A | | 1/1978 | Black et al. |
| 4,589,459 A | | 5/1986 | Lantrip |
| 4,693,289 A | | 9/1987 | Taylor et al. |
| 4,844,561 A | | 7/1989 | Savage et al. |
| 4,896,911 A | * | 1/1990 | Duke ............... 293/128 |
| 4,991,363 A | | 2/1991 | Randmae |
| 5,193,877 A | * | 3/1993 | George, Jr. .......... 296/136.1 |
| 5,273,316 A | | 12/1993 | Infante |
| 5,439,727 A | | 8/1995 | Riggs et al. |
| 5,518,289 A | * | 5/1996 | Cobble ............. 296/136.1 |
| 5,520,584 A | | 5/1996 | Brown, III |
| 5,611,572 A | | 3/1997 | Alava |
| 5,809,606 A | | 9/1998 | MacDonald et al. |
| 5,839,760 A | | 11/1998 | Johnson |
| 5,842,756 A | | 12/1998 | Haws |
| 5,845,958 A | | 12/1998 | Rudys et al. |
| 5,921,389 A | | 7/1999 | Zoffer |
| 5,957,796 A | * | 9/1999 | McLean ............. 474/146 |
| 6,059,105 A | | 5/2000 | Allain et al. |
| 6,129,408 A | | 10/2000 | Schultz et al. |
| 6,209,599 B1 | | 4/2001 | Richardson |
| 6,263,648 B1 | | 7/2001 | Carlson |
| 6,273,159 B1 | | 8/2001 | Page |
| 6,499,591 B1 | | 12/2002 | Rizzo et al. |
| 6,517,141 B1 | | 2/2003 | Su |
| 6,547,313 B2 | | 4/2003 | Syron |
| 6,837,006 B2 | * | 1/2005 | Deskin .............. 52/3 |
| 2002/0069947 A1 | * | 6/2002 | Frechette et al. ...... 150/166 |

* cited by examiner

*Primary Examiner*—Russell D. Stormer
(74) *Attorney, Agent, or Firm*—Chambliss, Bahner & Stophel

(57) ABSTRACT

A track cover adapted for use on an item of heavy construction equipment having at least one track. The track cover comprises an outside panel and a tread panel. The tread panel is preferably connected to the outside panel. The track cover also comprises an assembly for removably attaching the track cover to the item of heavy equipment. The track cover is adapted to cover at least a portion of the at least one track of the item of heavy construction equipment and retain dirt, rocks and other debris.

13 Claims, 10 Drawing Sheets

TRACK COVER

FIELD OF THE INVENTION

The present invention relates generally to covers for items of equipment, and particularly to a cover adapted for use on the tracks of an item of heavy construction equipment such as a bulldozer, excavator and the like.

BACKGROUND AND DESCRIPTION OF THE PRIOR ART

It is known to use a cover adapted to substantially enclose an object in order to retain dirt and other debris. See, e.g., U.S. Pat. No. 6,129,408 of Schultz, et al., U.S. Pat. No. 5,520,584 of Brown, III, and U.S. Pat. No. 3,927,578 of Mattila. It is also known to use a plurality of straps adapted to releasably attach a structure to the tracks of an item of heavy construction equipment. See, e.g., U.S. Pat. No. 4,068,905 of Black, et al. Further, it is known to use a solid piece of material adapted to constrict a cover around the object which it is covering. See, e.g., U.S. Pat. No. 6,129,408 of Schultz, et al. and U.S. Pat. No. 5,520,584 of Brown, III.

However, none of above-listed patents describe a track cover adapted for use on an item of heavy construction equipment such as a bulldozer, excavator and the like. Further, none of the above-listed patents describe a track cover having openings adapted to permit air to pass through the cover. In addition, none of the above-listed patents describe a track cover having a frame adapted to provide support and strength to the cover. Still further, none of the above-listed patents describe a track cover having a means for constricting such track cover around the tracks of an item of heavy construction equipment.

It would be desirable, therefore, if a track cover adapted for use on an item of heavy construction equipment such as a bulldozer, excavator and the like could be provided. It would also be desirable if such a track cover could be provided that would retain dirt, rocks and other debris during the transport of an item of heavy construction equipment. In addition, it would be desirable if such a track cover could be provided that would have openings adapted to permit air to pass through the track cover during the transport of an item of heavy construction equipment. It would be further desirable if such a track cover could be provided that would include a frame adapted to provide support and strength to the track cover. It would be still further desirable if such a track cover could be provided that would have a means for constricting the track cover around the tracks of item of heavy construction equipment. It would also be desirable if such a track cover could be provided that would be simple to use, cost-effective and time-efficient.

ADVANTAGES OF THE INVENTION

Accordingly, it is an advantage of the invention claimed herein to provide a track cover adapted for use on an item of heavy construction equipment such as a bulldozer, excavator and the like. It is also an advantage of the claimed invention to provide a track cover that is adapted to retain dirt, rocks and debris during the transport of an item of heavy construction equipment. In addition, it is an advantage of the claimed invention to provide a track cover having openings adapted to permit air to pass through the track cover. It is a further advantage of the claimed invention to provide a track cover that includes a frame adapted to provide support and strength to the track cover. It is a still further advantage of the claimed invention to provide a track cover that has a constricting assembly for securing the track cover around the tracks of the item of heavy construction equipment. It is also an advantage of the claimed invention to provide a simple to use, cost-effective and time-efficient track cover for items of heavy construction equipment.

Additional advantages of the invention will become apparent from an examination of the drawings and the ensuing description.

EXPLANATION OF TECHNICAL TERMS

As used herein, the term "non-porous" refers to a material that may not be permeated by dirt, rocks or other particulate matter. The term "non-porous" may include materials that permit light, air and/or water to pass therethrough.

As used herein, the term "porous" refers to a material that may be permeated by air or water. The term "porous" includes materials that have a plurality of minute interstices through which only air, water and the like may pass as well as materials that have one or more openings through which dirt, rocks and other particulate matter may pass.

SUMMARY OF THE INVENTION

The invention comprises a track cover adapted for use on an item of heavy construction equipment having at least one track. The track cover comprises an outside panel and a tread panel. The tread panel is preferably connected to the outside panel. The track cover also comprises a means for removably attaching the track cover to the at least one track of the item of heavy equipment. The track cover is adapted to cover at least a portion of the at least one track of the item of heavy construction equipment and retain dirt, rocks and other debris.

In a preferred embodiment, the track cover of the claimed invention comprises a first track cover portion and a second track cover portion. The preferred first track cover portion comprises a first outside panel and a first tread panel. The preferred first track cover portion and the preferred second track cover portion are adapted to cover at least a portion of the tracks of an item of heavy construction equipment and retain dirt, rocks and debris. The first tread panel is preferably connected to the first outside panel. The preferred first track cover portion also comprises a first forward panel and a first rearward panel. The first forward panel and the first rearward panel are preferably connected to the first tread panel. The first front panel preferably includes one or more openings adapted to permit air to flow therethrough.

Also in the preferred embodiment of the claimed invention, the track cover of the claimed invention comprises a second track cover portion. The preferred second track cover portion comprises a second outside panel and a second tread panel. The second tread panel is preferably connected to the second outside panel. The preferred second track cover portion also comprises a second forward panel and a second rearward panel. The second forward panel and the second rearward panel are preferably connected to the second tread panel. The second rear panel preferably includes one or more openings adapted to permit air to flow therethrough.

The preferred embodiment of the track cover of the claimed invention further comprises a means for removably attaching the first and second track cover portions to the tracks of an item of heavy construction equipment, a means for releasably attaching the first forward panel to the second forward panel, and a means for releasably attaching the first rearward panel to the second rearward panel. Also in the preferred embodiment of the claimed invention, the track cover includes at least one constricting assembly for securing the track cover around the tracks of an item of heavy construction equipment and a frame for providing support and strength to the track cover.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
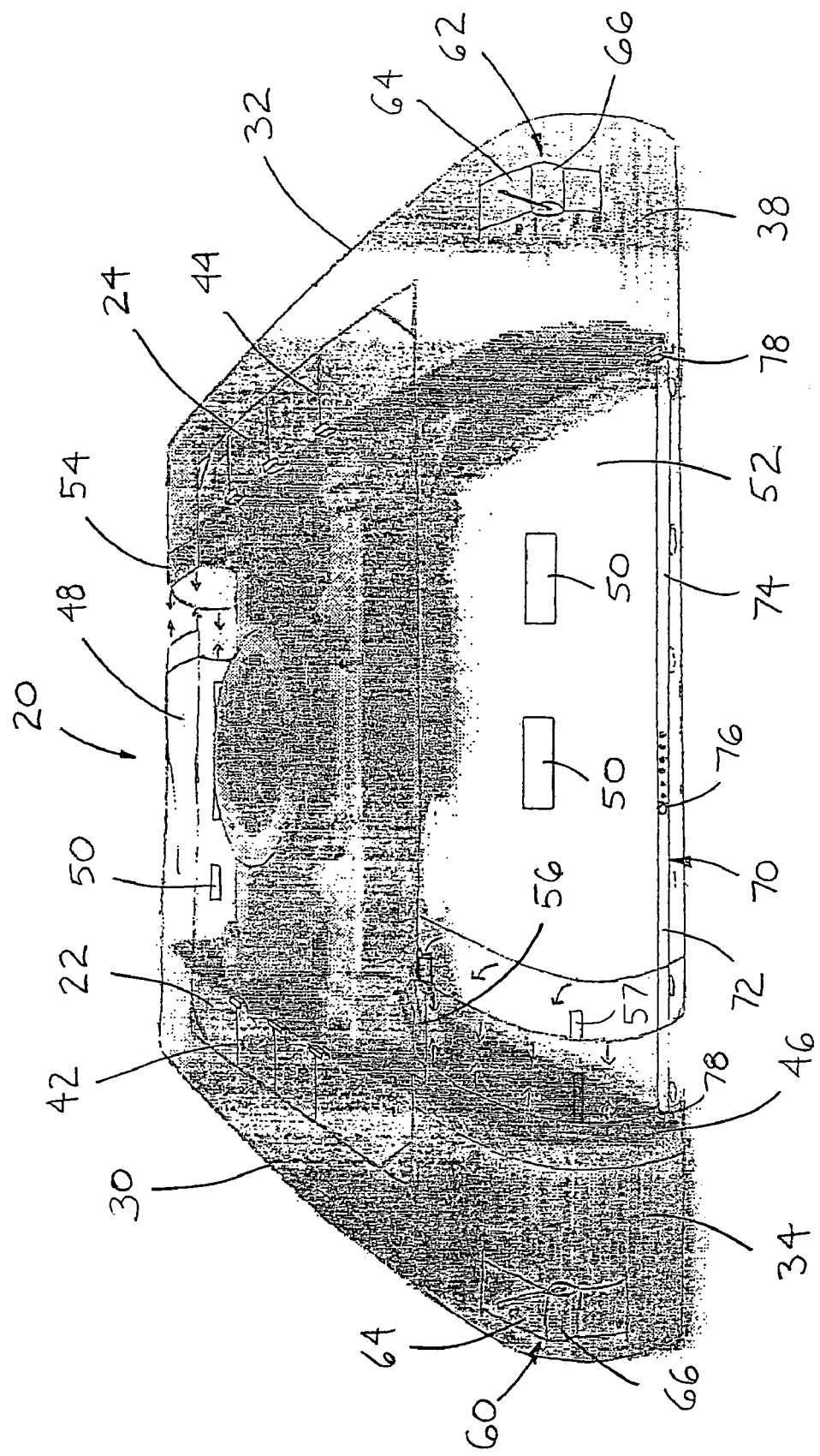
FIG. 1 is a perspective view of the preferred embodiment of the track cover of the present invention shown on the tracks of an item of heavy construction equipment.

Referring now to the drawings, the preferred embodiments of the track cover of the claimed invention are illustrated by FIGS. 1 through 10. Referring to FIG. 1, a perspective view of the preferred embodiment of the track cover of the present invention is illustrated. More particularly, as shown in FIG. 1, preferred track cover 20 is adapted to cover the outside and a portion of the tread area of tracks 22 and 24 of an item of heavy construction equipment such as a bulldozer, an excavator and the like. Further, the preferred track cover 20 is adapted to retain dirt, rocks and other debris during the transport of such an item of heavy construction equipment.

Still referring to FIG. 1, the preferred track cover 20 includes first track cover portion 30 and second track cover portion 32. The preferred first track cover portion 32 includes first tread panel 34 and first outside panel 36 (see FIG. 2). The preferred first tread panel 34 is adapted to cover a portion of the tread of track 22. It is contemplated within the scope of the invention that first tread panel 34 may cover the entire tread area of a track of an item of heavy construction equipment. The preferred first tread panel 34 is preferably made of a flexible, non-porous material such as vinyl, canvas and the like. It is also contemplated within the scope of the invention, however, that the first tread panel may be made from a rigid material such as hard plastic and the like. It is further contemplated within the scope of the invention that the preferred first outside panel 36 (see FIG. 2) may be either fixedly or removably attached to first tread panel 34.

Figure 2:
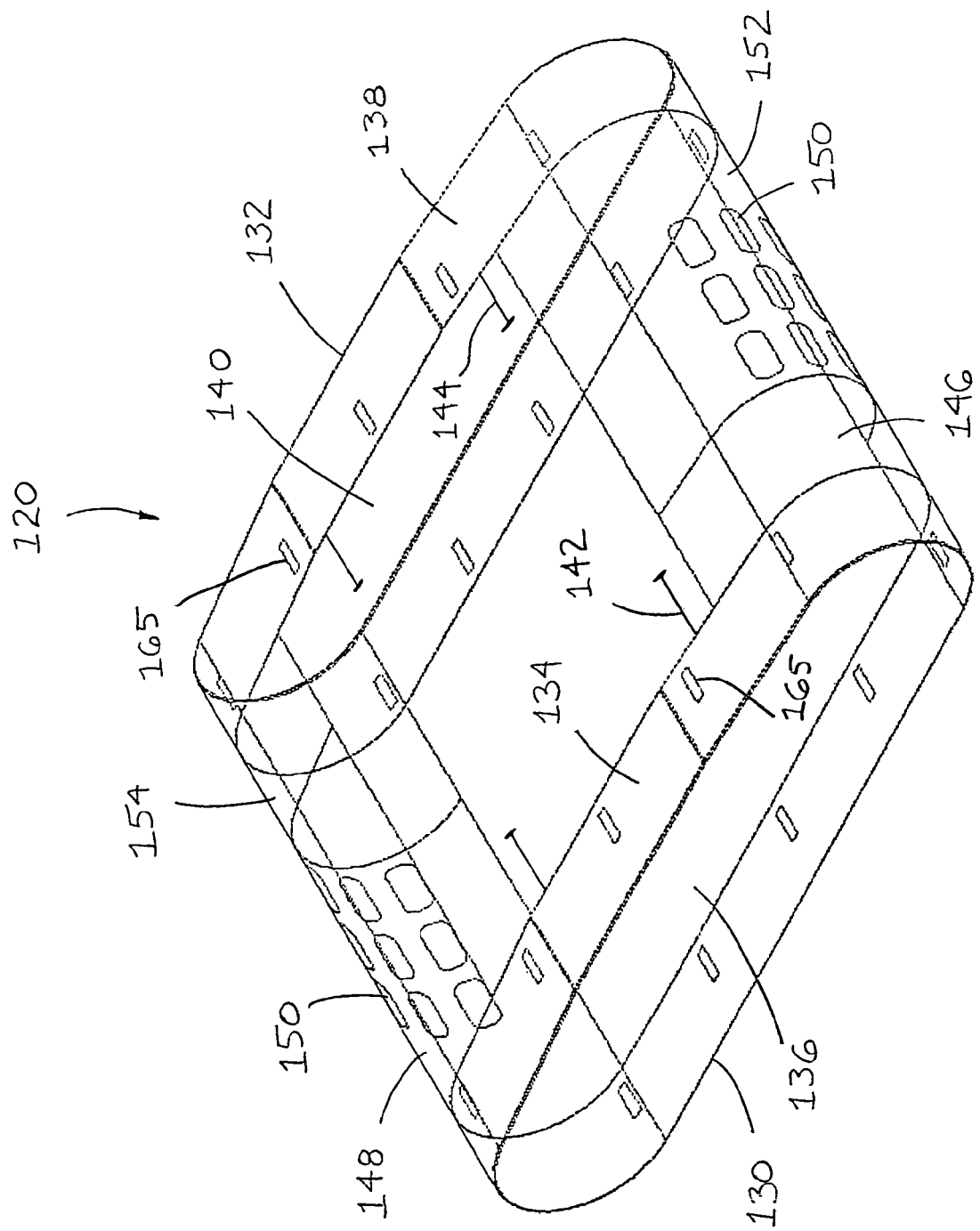
FIG. 2 is a perspective view of a first alternative embodiment of the track cover of the present invention.

Still referring to FIG. 1, the preferred second track cover portion 32 includes second tread panel 38 and second outside panel 40 (see FIG. 2). The preferred second tread panel 38 is adapted to cover a portion of the tread of track 24. It is contemplated within the scope of the invention that second tread panel 38 may cover the entire tread area of a track of an item of heavy construction equipment. The preferred second tread panel 38 is preferably made of a flexible, non-porous material such as vinyl, canvas and the like. It is also contemplated within the scope of the invention, however, that the second tread panel may be made from a rigid material such as hard plastic and the like. It is contemplated within the scope of the invention that the preferred second outside panel 40 (see FIG. 2) may be either fixedly or removably attached to second tread panel 38.

Referring still to FIG. 1, the preferred track cover 20 includes means for removably attaching first track cover portion 30 to track 22 of an item of heavy construction equipment such as nylon webbing and hook assembly 42. Similarly, the preferred track cover 20 includes means for removably attaching second track cover portion 32 to track 24 of an item of heavy construction equipment such as nylon webbing and hook assembly 44. Preferably, the means for removably attaching the first track cover portion and the second track cover portion to the track of an item of heavy construction equipment are attached to the first and second tread panels of the track cover, respectively. It is contemplated within the scope of the invention, however, that the means for removably attaching the first and second track cover portions to the tracks of an item of heavy construction equipment may be attached to the first and second outside panels of the track cover, respectively. Further, while nylon webbing and hook assemblies 42 and 44 are illustrated in FIG. 1 as the preferred means for removably attaching the first and second track cover portions to the tracks of an item of heavy equipment, it is contemplated within the scope of the invention that any suitable means for removably attaching the first and second track cover portions to the tracks of an item of heavy construction equipment such as a buckle and strap assembly, a mating snap and strap assembly and the like may be used.

Still referring to FIG. 1, preferred track cover 20 includes first front panel 46 and first rear panel 48. The preferred first front panel 46 and the preferred first rear panel 48 are adapted to extend from first track cover portion 30 toward second track cover portion 32. The preferred first front panel 46 and the preferred first rear panel 48 are preferably attached to first tread panel 34 of first track cover portion 30. It is contemplated within the scope of the invention, however, that the first front panel and/or the first rear panel may be attached to the first outside panel. The preferred first front panel 46 and the preferred first rear panel 48 are made from a flexible, porous material such as nylon and the like. It is contemplated within the scope of the invention, however, that the front panel and/or the rear panel of the track cover may be made from a rigid material such as hard plastic and the like. In addition, the preferred first front panel 46 includes a plurality of openings 50 which are adapted to permit air to flow therethrough. It is also contemplated within the scope of the invention that first rear panel 48 may include one or more openings adapted to permit air to flow therethrough.

In addition, preferred first front panel 46 and preferred first rear panel 48 are provided with means for releasably attaching the distal ends of such panels to second front panel 52 and second rear panel 54, which are described in detail below. The preferred means for releasably attaching the first front panel and the first rear panel the second front panel and the second rear panel, respectively, is a hook and loop fastener arrangement including straps 56 and pads 57. It is contemplated within the scope of the invention, however, that any suitable means for releasably attaching the first front panel and the first rear panel to the second front panel and the second rear panel, respectively, such as a buckle and strap arrangement, a mating snap and strap arrangement and the like may be used.

Referring still to FIG. 1, the preferred second track cover portion 32 includes second front panel 52 and second rear panel 54. The preferred second front panel 52 and second rear panel 54 are adapted to extend from second track cover portion 32 toward first track cover portion 30. The preferred second rear panel 54 includes a plurality of openings 50 which are adapted to permit air to flow therethrough. It is contemplated within the scope of the invention, however, that the second front panel may include one or more openings adapted to permit air to flow therethrough. Preferably, second front panel 52 and second rear panel are made from a flexible, porous material such as nylon and the like. It is also contemplated within the scope of the invention, however, that the second front and rear panels may be made from a rigid material such as hard plastic and the like. Further, the preferred second front panel 52 and the preferred second rear panel 54 are preferably attached to second tread panel 38. It is contemplated within the scope of the invention, however, that the second front panel and the second rear panel may be attached to the second outside panel.

Still further, like the preferred first front panel and the preferred first rear panel, the preferred second front panel 52 and the preferred second rear panel 54 are provided with a means for releasably attaching the distal end of such panels to first front panel 46 and first rear panel 48, respectively. As noted above, the preferred means for releasably attaching the second front panel and the second rear panel to the first front panel and the first rear panel, respectively, is a hook and loop fastener including straps 56 and pads 57. It is contemplated, however, that any suitable means for releasably attaching the second front panel and the second rear panel to the first front panel and the first rear panel, respectively, such as a buckle and strap arrangement, a mating snap and strap arrangement, and the like may be used.

Still referring to FIG. 1, the preferred track cover 20 also includes a constricting assembly for securing the track cover around the tracks of an item of heavy construction equipment. More particularly, as shown in FIG. 1, the preferred track cover 20 includes first constricting assembly 60 for constricting first track cover portion 30 around track 22 and second constricting assembly 62 for constricting second track cover portion 32 around track 24. The preferred constricting assemblies comprise elongate member 64 and ratcheting device 66 which are adapted to constrict the first and second tread panels into bearing contact with the tracks of an item of heavy construction equipment. While the preferred constricting assemblies are illustrated in FIG. 1 as being located adjacent to the tread portion of tracks 22 and 24, it is also contemplated within the scope of the invention that the constricting assemblies may be located to the interior of tracks 22 and 24 so that the first and second tread panels are constricted into bearing contact with the entire tread portion of the tracks of an item of heavy construction equipment. It is also contemplated that the track cover may be adapted to cover a portion of or the entire framework and other equipment components located between the tracks of an item of heavy construction equipment. It is further contemplated that any suitable constricting assembly adapted to constrict the first and second track portions around the tracks of an item of heavy construction equipment such as a buckle and strap arrangement, a mating snap and strap arrangement, and the like may be used.

Still referring to FIG. 1, the preferred track cover 20 includes frame 70. The preferred frame 70 is adapted to provide support and strength to the track cover. More particularly, as shown in FIG. 1, the preferred frame 70 is adapted to provide support and strength to first front panel 46 and second front panel 52. It is also contemplated that frame 70 may be provided to support and strengthen first rear panel 48 and second rear panel 54. The preferred frame 70 includes a plurality of frame members 72 and 74. The preferred frame members 72 and 74 are adapted to extend between tracks 22 and 24 of an item of heavy construction equipment. The preferred frame members 72 and 74 are each provided with "C" bracket 78 for mounting the frame member to the track of the item of heavy construction equipment. It is contemplated within the scope of the invention, however, that the frame members may be removably mounted to the tracks of an item of heavy construction equipment using any suitable means.

In addition, the preferred frame members 72 and 74 are adapted to be adjustably connected to each other such as by pin and hole arrangement 76. It is contemplated within the scope of the invention, however, that the frame members may be connected to each other by any suitable means such as threaded fasteners, rivets, welding, and the like. It is further contemplated that the frame members may be telescoping in nature such that the lengths of the individual frame members may be increased and decreased. It is still further contemplated that a single telescoping frame member may be used to extend between tracks 22 and 24 of an item of heavy construction equipment. While FIG. 1 illustrates a pair of frame members in substantially parallel relationship extending between tracks 22 and 24, it is also contemplated that any suitable arrangement of frame members may be used to provide support and strength to the track cover. For example, the frame may include frame members that are perpendicular to preferred frame members 72 and 74, and/or frame members that are arcuate or angled in configuration.

Referring now to FIG. 2, a first alternative embodiment of the track cover of the invention is illustrated. As shown in FIG. 2, the preferred track cover 120 includes first track cover portion 130 and second track cover portion 132. The preferred first track cover portion 130 includes first tread panel 134 and first outside panel 136. The preferred first tread panel 134 is adapted to cover at least a portion of the tread area of a track of an item of heavy construction equipment. The preferred first outside panel 136 is adapted to cover the outside portion of the track of an item of heavy construction equipment and retain dirt, rocks, and other debris. The preferred first outside panel is preferably made from a flexible, non-porous material such as vinyl, canvas and the like. It is contemplated within the scope of the invention, however, that the first outside panel may be made from a rigid material such as hard plastic and the like. The preferred first outside panel 136 is preferably attached to first tread panel 134. It is contemplated within the scope of the invention that the preferred first outside panel 136 may be either fixedly or removably attached to first tread panel 134.

Still referring to FIG. 2, the preferred second track cover portion 132 includes second tread panel 138 and second outside panel 140. The preferred second tread panel 138 is adapted to cover at least a portion of the tread area of a track of an item of heavy construction equipment. The preferred second outside panel 140 is adapted to cover the outside portion of the track of an item of heavy construction equipment and retain dirt, rocks, and other debris. The preferred second outside panel is preferably made from a flexible, non-porous material such as vinyl, canvas and the like. It is contemplated within the scope of the invention, however, that the second outside panel may be made from a rigid material such as hard plastic and the like. The preferred second outside panel 140 is preferably attached to second tread panel 138. It is contemplated within the scope of the invention that the preferred second outside panel 140 may be either fixedly or removably attached to second tread panel 138.

Referring still to FIG. 2, the preferred first track cover portion 130 includes means for removably attaching the track cover portion to the tracks of an item of heavy construction equipment such as nylon webbing and hook 142. Similarly, the preferred second track cover portion 132 includes means for removably attaching the track cover portion to the tracks of an item of heavy construction equipment such as nylon webbing and hook 144. It is contemplated within the scope of the invention, however, that the first and second track cover portions may be removably attached to the tracks of an item of heavy construction equipment using any suitable means. The preferred first and second track cover portions include a means for constricting the track cover portions around the tracks of an item of heavy construction equipment. More particularly, FIG. 2 illustrates a plurality of loops 165 which are adapted to receive an elongate member (not shown) such as elongate member 64 shown in FIG. 1. In addition, the constricting assembly shown in FIG. 2 may include a ratcheting device (not shown) like ratcheting device 66 shown in FIG. 1. It is also contemplated, however, that the constricting assembly shown in FIG. 2 may include any suitable device adapted to constrict an elongate member around the track of an item of heavy construction equipment such as a buckle and strap arrangement and the like.

Figure 3:
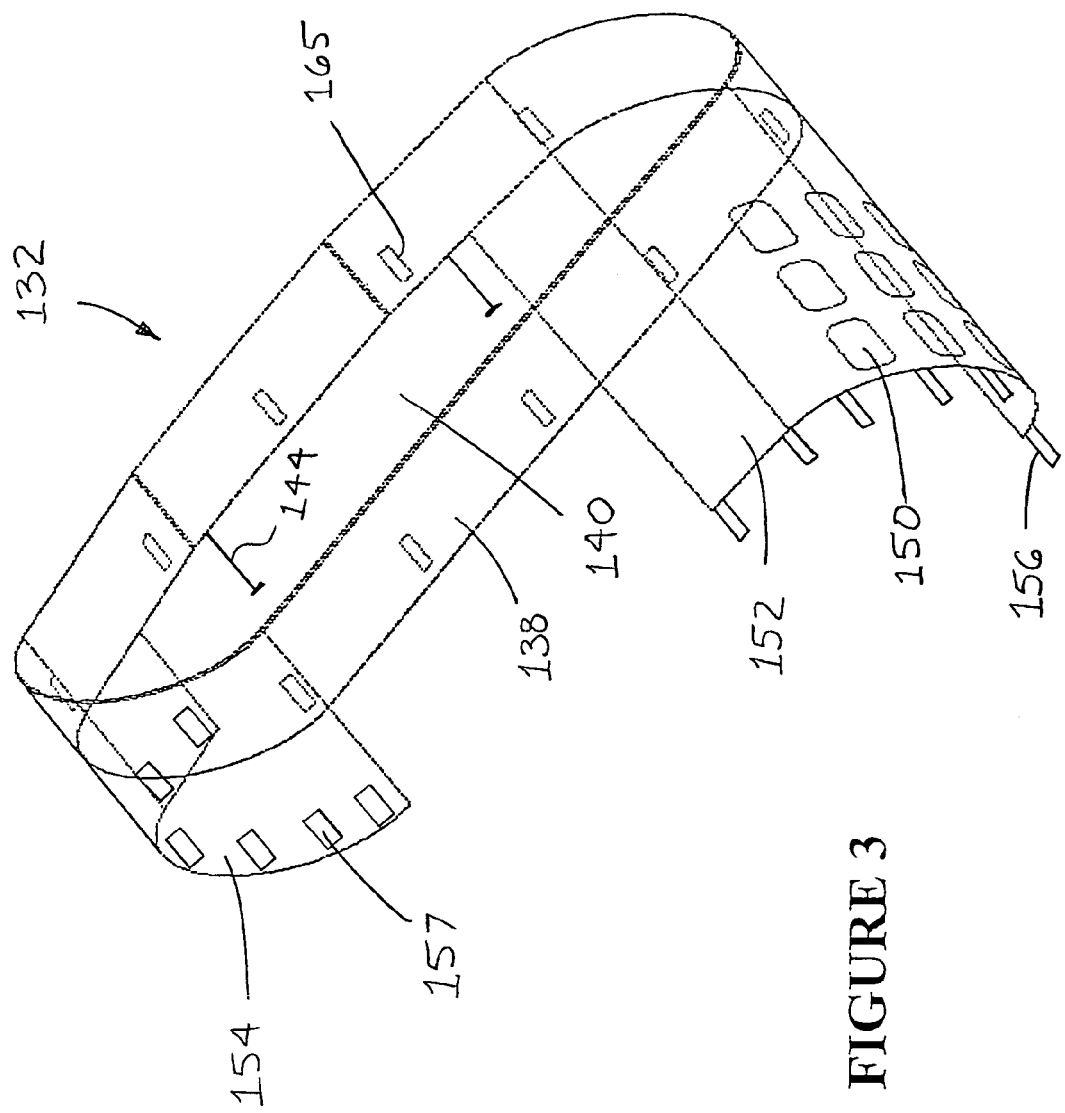
FIG. 3 is a perspective view of the second track cover portion of the preferred embodiment of the track cover shown in FIG. 2.

Referring now to FIG. 3, a perspective view of the second track cover portion of the preferred embodiment of the track cover shown in FIG. 2 is illustrated. More particularly, as shown in FIG. 3, the preferred second track cover portion 132 includes second tread panel 138, second outside panel 140, nylon webbing and hook arrangement 144, second front panel 152 having a plurality of openings 150, second rear panel 154, straps 156, pads 157 and loops 165.

Figure 4:
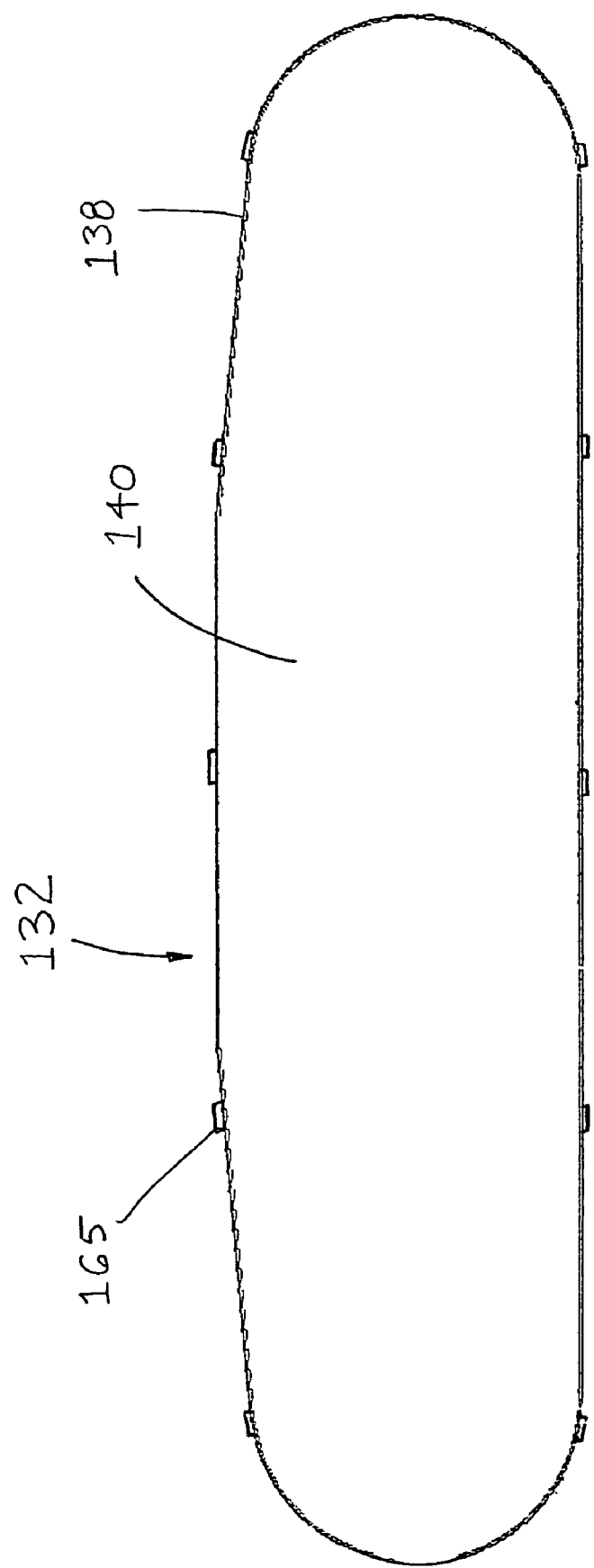
FIG. 4 is a side view of the preferred embodiment of the track cover shown in FIG. 3.

Referring now to FIG. 4, a side view of the preferred embodiment of the track cover shown in FIG. 3 is illustrated. More particularly, as shown in FIG. 4, the preferred second track cover portion 132 includes second tread panel 138, second outside panel 140 and loops 165.

Figure 5:
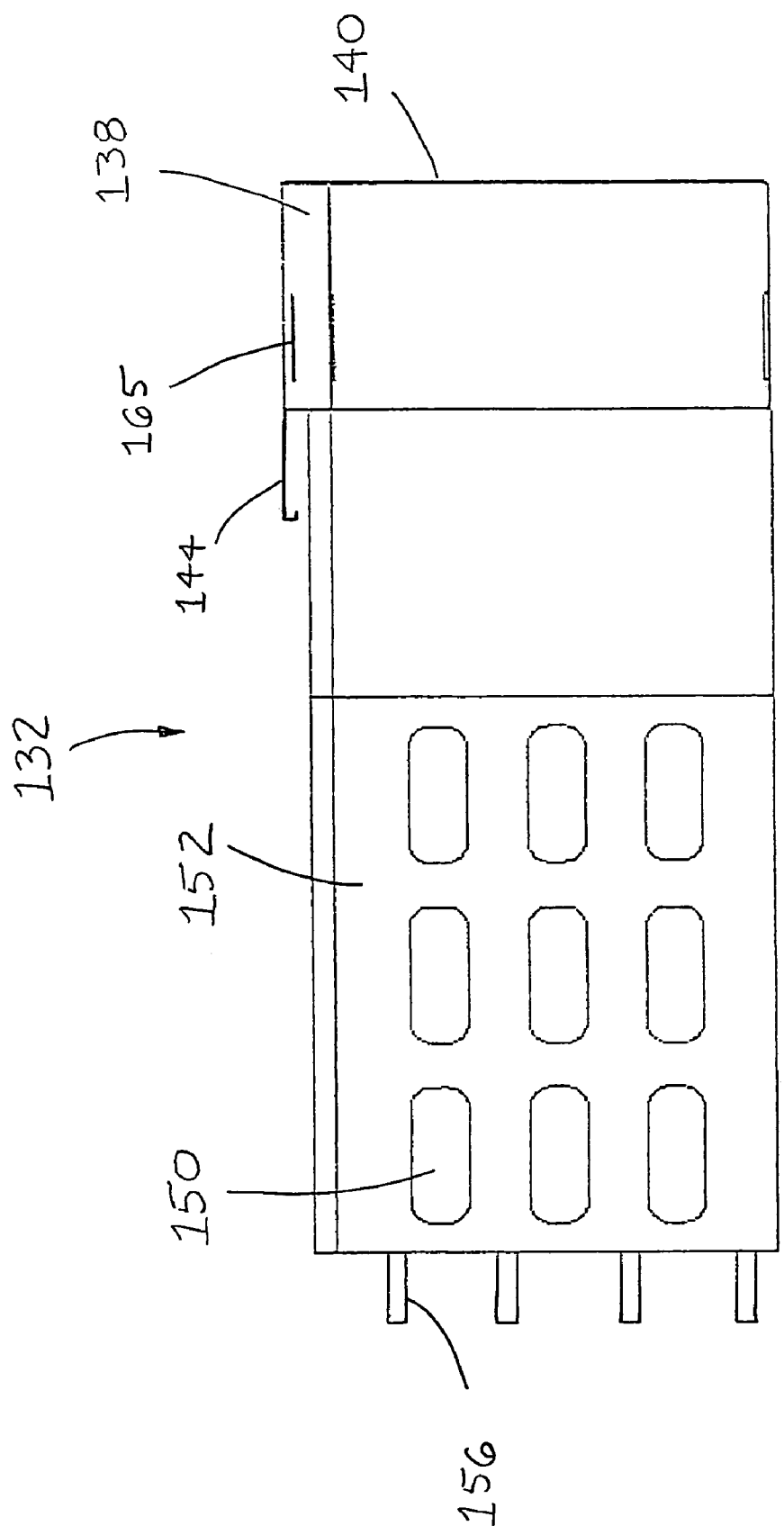
FIG. 5 is a front view of the preferred embodiment of the track cover shown in FIG. 3.

Referring now to FIG. 5, a front view of the preferred embodiment of the track cover shown in FIG. 3 is illustrated. More particularly, as shown in FIG. 5, the preferred second track cover portion 132 includes second tread panel 138, second outside panel 140, nylon webbing and hook arrangement 144 and second front panel 152 having a plurality of openings 150, straps 156 and loops 165.

Figure 6:
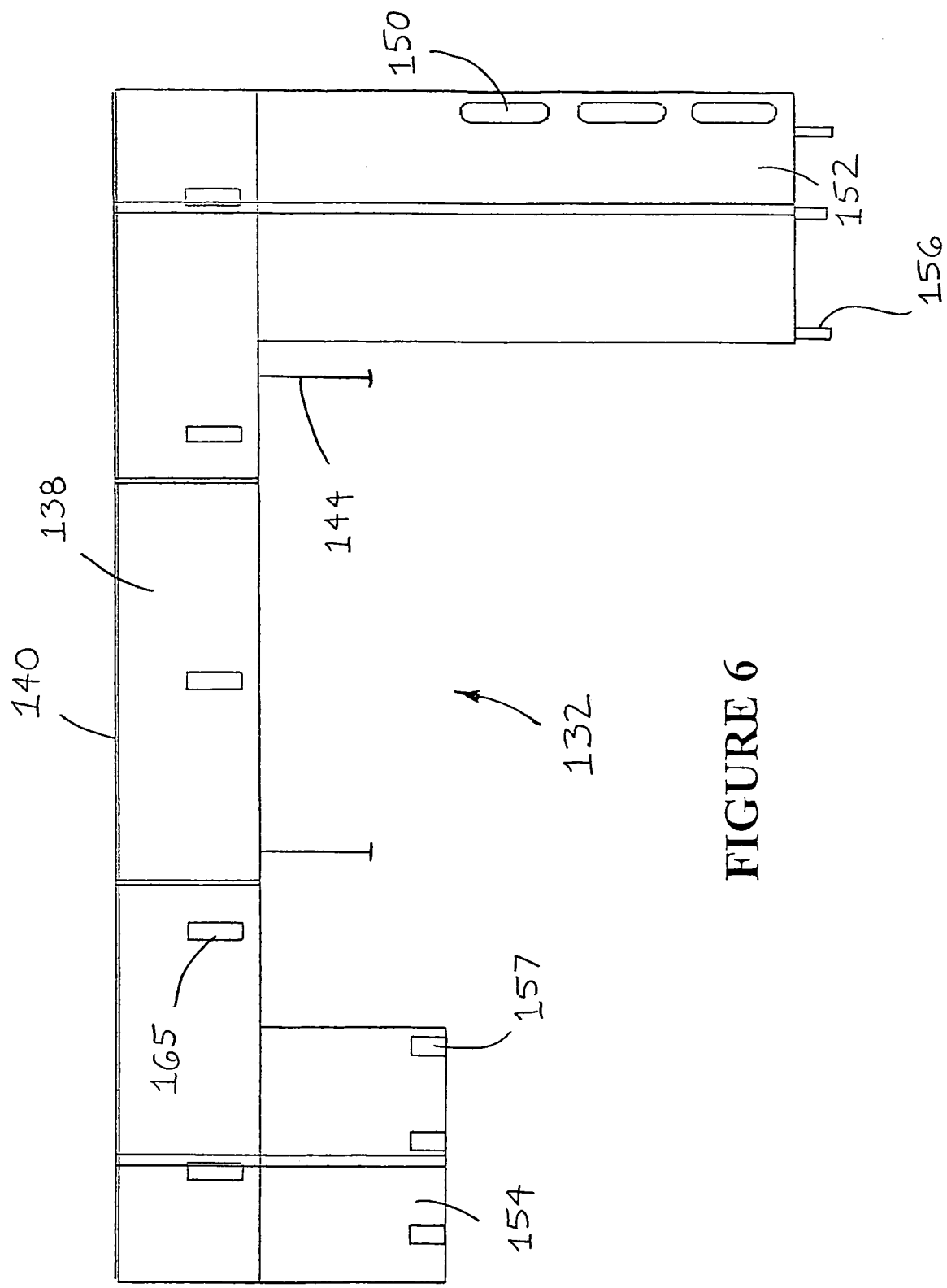
FIG. 6 is a top view of the preferred embodiment of the track cover shown in FIG. 3.

Referring now to FIG. 6, a top view of the preferred embodiment of the track cover shown in FIG. 3 is illustrated. More particularly, as shown in FIG. 6, the preferred second track cover portion 132 includes second tread panel 138, second outside portion 140, nylon webbing and hook arrangement 144, second front panel 152 having a plurality of openings 150, and second rear panel 154, straps 156, pads 157 and loops 165.

Figure 7:
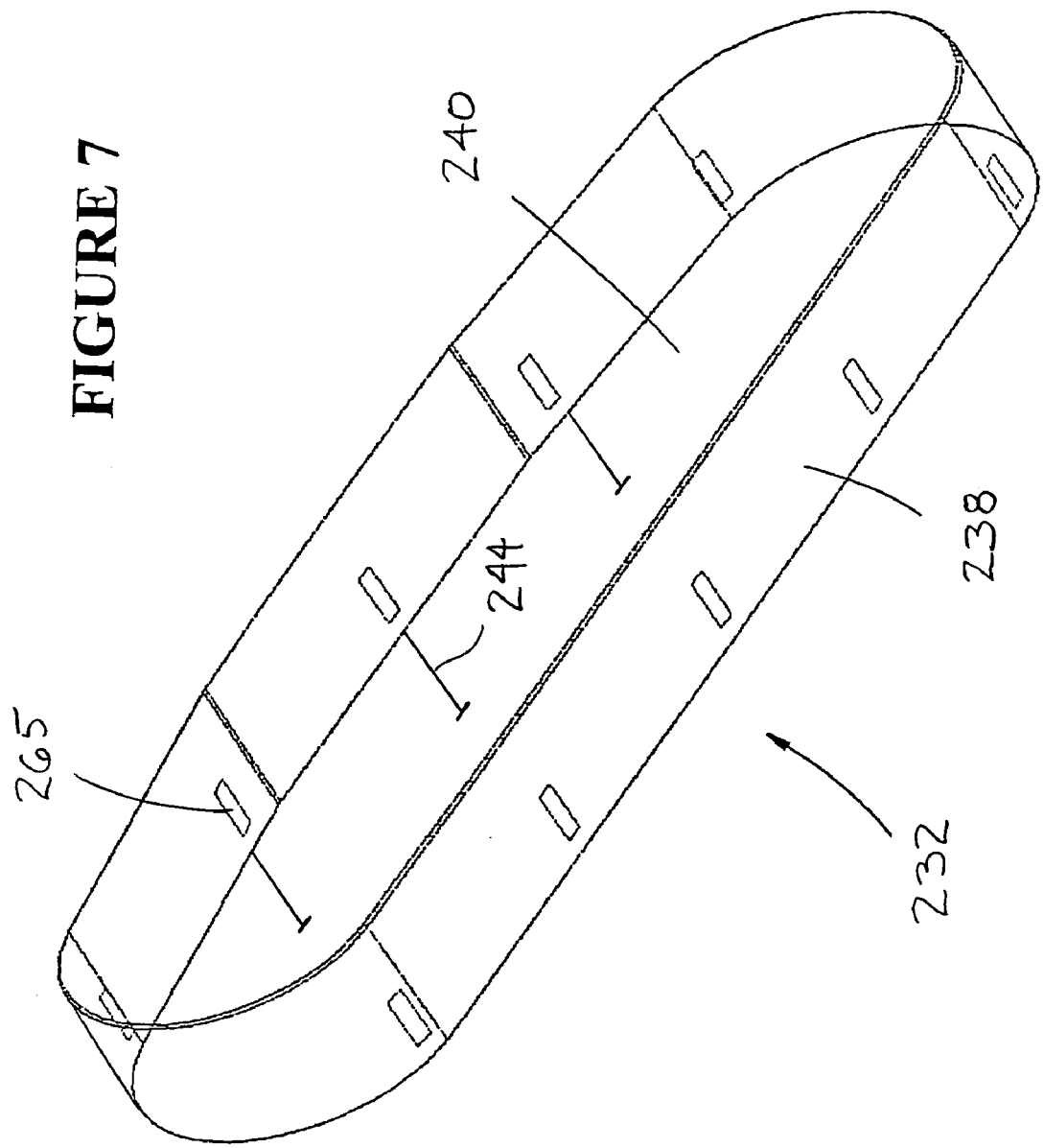
FIG. 7 is a perspective view of a second alternative embodiment of the track cover of the present invention.

Referring now to FIG. 7, a perspective view of a second alternative embodiment of the track cover of the present invention is illustrated. More particularly, as shown in FIG. 7, the preferred track cover 232 is adapted to cover the outside of the track of an item of heavy construction equipment and a portion of the tread area of the track of an item of heavy construction equipment. It is also contemplated within the scope of the invention that the preferred track cover 232 may be adapted to cover the entire tread area of the track of an item of heavy construction equipment.

As shown in FIG. 7, the preferred track cover 232 comprises tread panel 238, outside panel 240, nylon webbing and hook arrangement 244, and loops 265. The components of the preferred track cover 232 are substantially identical to the corresponding components of the preferred track cover 20 and the preferred track cover 120. As shown in FIG. 7, the preferred track cover 232 does not include front or rear panels or frame members. It is contemplated within the scope of the invention, however, that the preferred track cover 232 may include front and/or rear panels (with or without openings) and/or frame members. Like the preferred track cover portions 130 and 132 described above, loops 265 are adapted to receive an elongate member (not shown) adapted to be constricted around the tracks of the item of heavy construction equipment. Also like the preferred track cover portions 130 and 132 described above, a ratcheting device (not shown) or other means for tightening and locking the elongate member around the tracks of the item of heavy construction equipment may also be provided.

Figure 8:
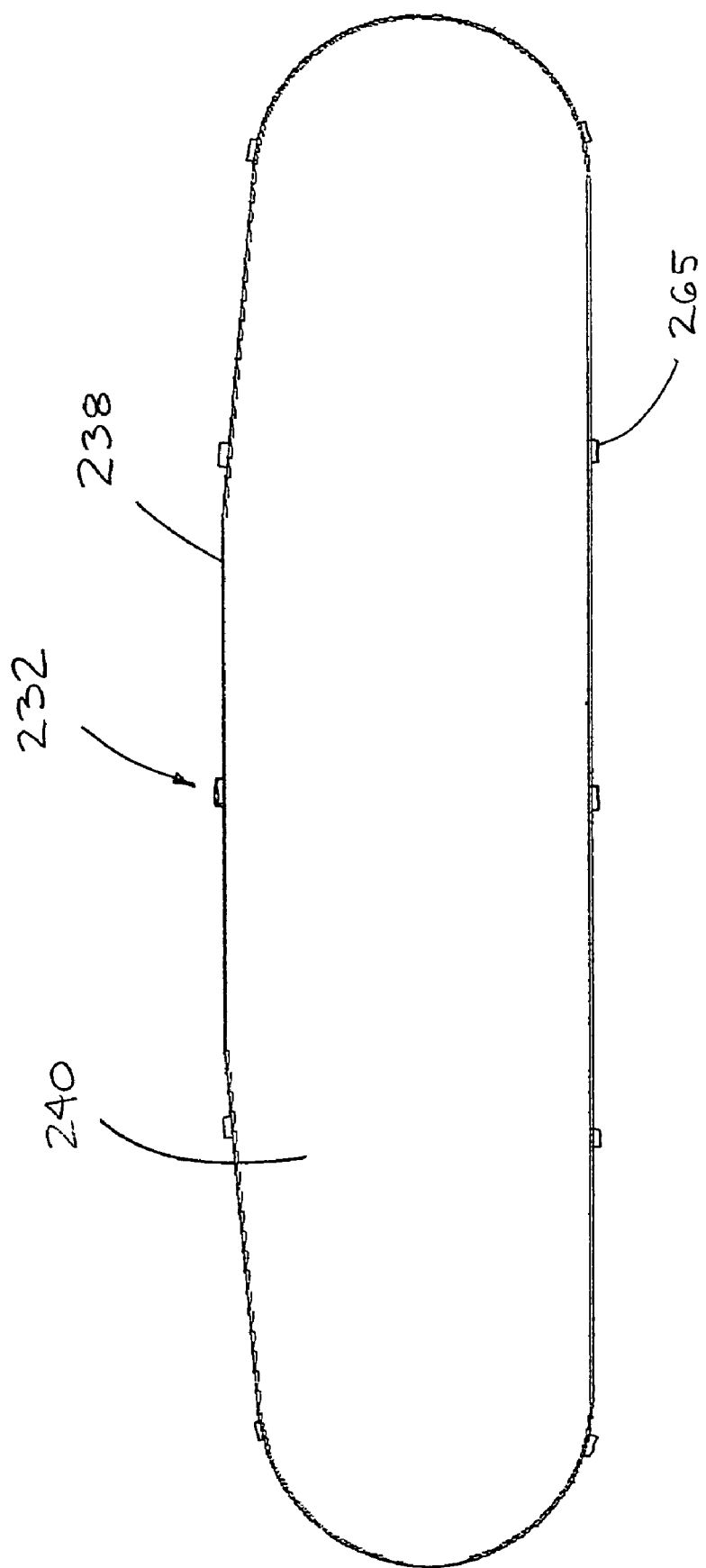
FIG. 8 is a side view of the preferred embodiment of the track cover shown in FIG. 7.

Referring now to FIG. 8, a side view of the preferred embodiment of the track cover shown in FIG. 7 is illustrated. More particularly, as shown in FIG. 8, the preferred track cover 232 includes tread panel 238, outside panel 240 and loops 265.

Figure 9:
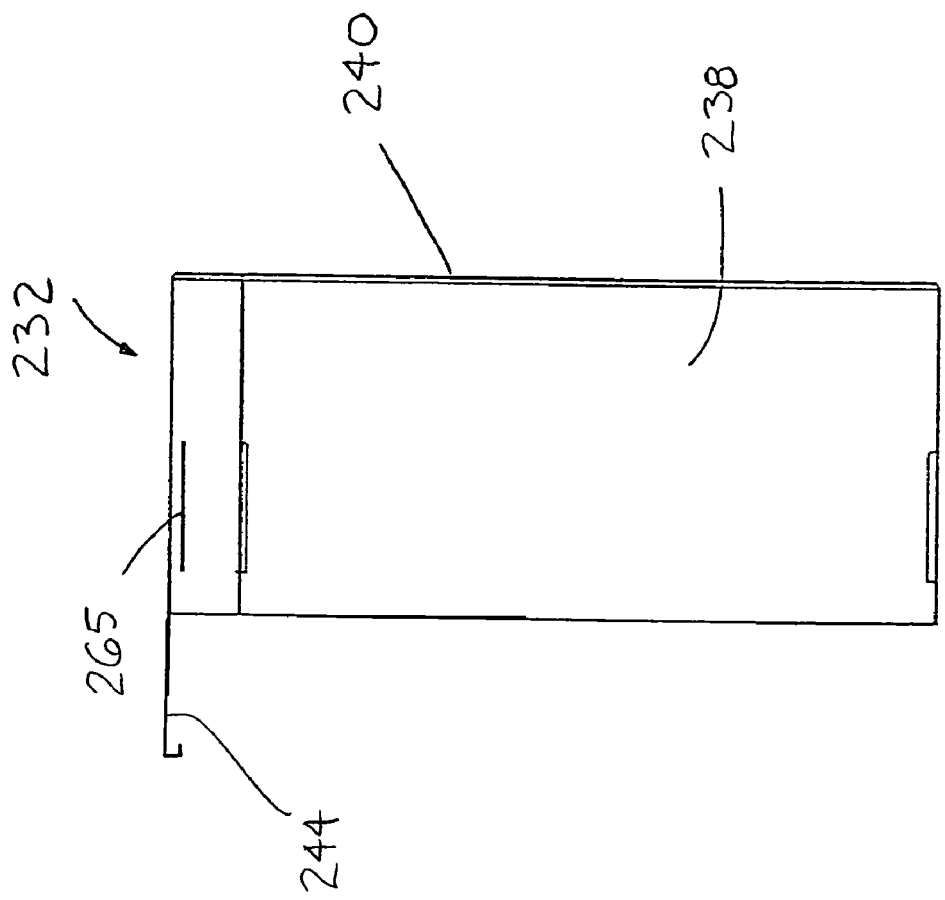
FIG. 9 is a front view of the preferred embodiment of the track cover shown in FIG. 7.

Referring now to FIG. 9, a front view of the preferred embodiment of the track cover shown in FIG. 7 is illustrated. More particularly, as shown in FIG. 9, the preferred track cover 232 includes tread panel 238, outside panel 240, nylon webbing and hook arrangement 244 and loops 265.

Figure 10:
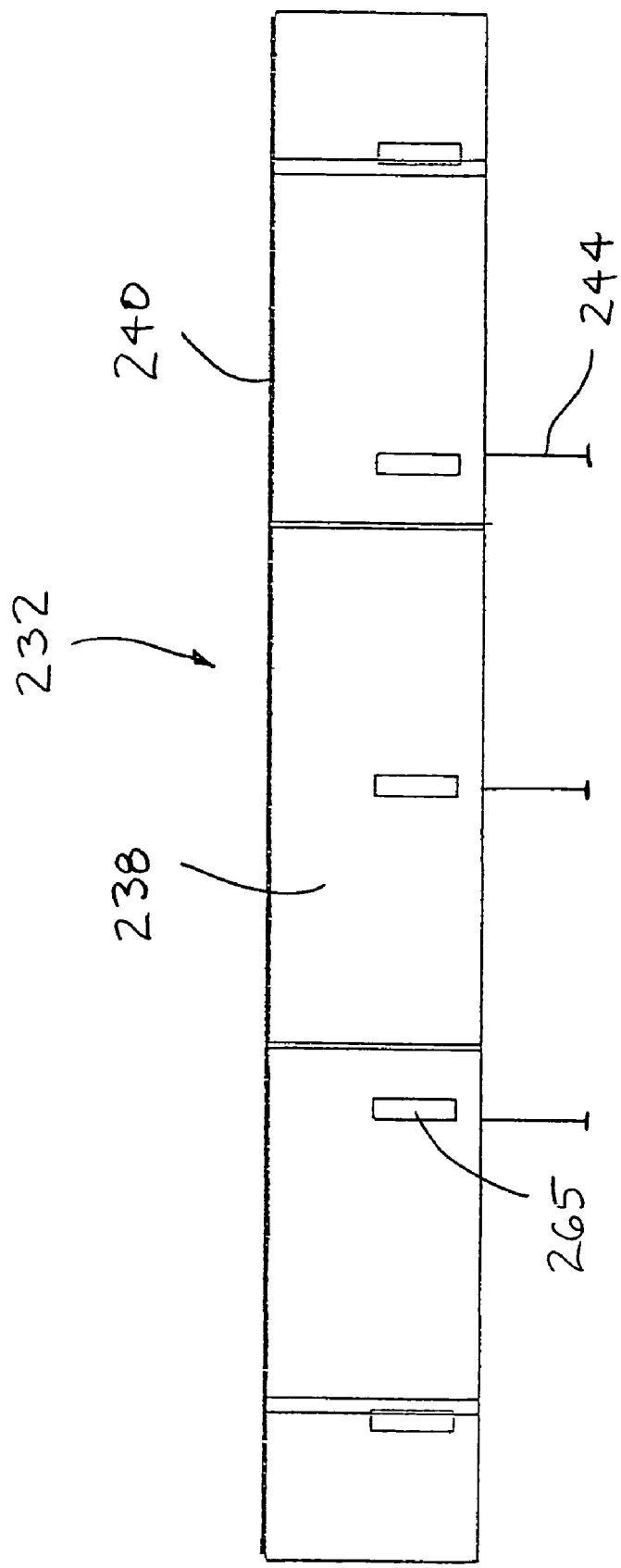
FIG. 10 is a top view of the preferred embodiment of the track cover shown in FIG. 7.

Referring now to FIG. 10, a top view of the preferred embodiment of the track cover shown in FIG. 7 is illustrated. More particularly, as shown in FIG. 10, the preferred track cover 232 includes tread panel 238, outside panel 240, nylon webbing and hook arrangement 244 and loops 265.

In operation, several advantages of the track cover of the claimed invention are achieved. For example, the track cover of the claimed invention is adapted to be applied to the tracks of an item of heavy construction equipment such that it retains dirt, rocks and other debris which accumulate in and around the tracks of the item of heavy construction equipment. With the track cover of the claimed invention applied to the tracks of the item of heavy construction equipment, the risk of dirt, rocks and other debris falling from the tracks of the item of heavy construction equipment during transport is significantly reduced or eliminate.

In addition, several features of the claimed invention improve the utility of the track cover of the claimed invention during the transport of an item of heavy construction equipment. For example, the preferred track cover has a plurality of openings adapted to permit air to pass through the front and rear panels of the track cover. The preferred track cover also includes a frame adapted to provide support and strength to the track cover. In addition, the preferred track cover has a constricting assembly for securing the track cover around the tracks of an item of heavy construction equipment.

Still further, the track cover of the claimed invention is a simple, cost-effective and time-efficient alternative to the standard practice in the industry for preparing items of heavy construction equipment for transport. The track cover of the claimed invention minimizes or eliminates the labor-intensive and time-consuming practice of cleaning dirt, rocks and other debris from the tracks of an item of heavy construction equipment prior to transport. The track cover is easy to apply to the tracks of an item of heavy construction equipment inasmuch as it does not require the use of any tools and it may be applied by as few as one person. In addition, the track cover of the claimed invention provides a greater measure of protection against falling dirt, rocks and other debris during transport than the conventional cleaning method which frequently results in some amount of dirt, rocks and other debris not being removed from the tracks of an item of heavy construction equipment prior to transport.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A track cover adapted for use on an item of heavy construction equipment having a first track and a second track, said track cover comprising:
   A. a first track cover portion for covering at least a portion of the first track of the item of heavy construction equipment, said first track cover portion comprising:
      (1) a first outside panel;
      (2) a first tread panel, said first tread panel being connected to said first outside panel;
      (3) a first forward panel; and
      (4) a first rearward panel, said first forward panel and said first rearward panel being connected to said first tread panel;
   B. a second track cover portion for covering at least a portion of the second track of the item of heavy construction equipment, said second track cover portion comprising:
      (1) a second outside panel;
      (2) a second tread panel, said second tread panel being connected to said second outside panel;
      (3) a second forward panel;
      (4) a second rearward panel, said second forward panel and said second rearward panel being connected to said second tread panel;
      (5) means for releasably attaching said first forward panel to said second forward panel; and
      (6) means for releasably attaching said first rearward panel to said second rearward panel;
   wherein said first track cover portion and said second track cover portion are adapted to retain dirt, rocks and debris.

2. The track cover of claim 1 wherein the first outside panel and the second outside panel are non-porous.

3. The track cover of claim 1 wherein the first outside panel and the second outside panel are flexible.

4. The track cover of claim 1 wherein the first tread panel and the second tread panel are non-porous.

5. The track cover of claim 1 wherein the first tread panel and the second tread panel are flexible.

6. The track cover of claim 1 wherein at least one of said first forward panel and second forward panel is porous.

7. The track cover of claim 1 wherein at least one of said first rearward panel and second rearward panel is porous.

8. The track cover of claim 1 further including a means for removably attaching the first track cover portion to the item of heavy construction equipment and a means for removably attaching the second track cover portion to the item of heavy construction equipment.

9. The track cover of claim 8 wherein the means for removably attaching the first track cover portion to the item of heavy construction equipment and the means for removably attaching the second track cover portion to the item of heavy construction equipment are nylon webbing and hook assembly.

10. The track cover of claim 1 further including a first constricting assembly for securing the first track cover portion around the first track of the item of heavy construction equipment and a second constricting assembly for securing the second track cover portion around the second track of the item of heavy construction equipment.

11. The track cover of claim 10 wherein the first constricting assembly for securing the first track cover portion around the first track of the item of heavy construction equipment and the second constricting assembly for securing the second track cover portion around the second track of the item of heavy construction equipment comprise an elongate member and a ratcheting device.

12. The track cover of claim 1 further including a frame.

13. The track cover of claim 12 wherein the frame includes a plurality of detachably connected frame members.

* * * * *